US009544083B2

(12) United States Patent
Reddy (10) Patent No.: US 9,544,083 B2
(45) Date of Patent: Jan. 10, 2017

(54) SECONDARY SYNCHRONIZATION SIGNAL DETECTION WITH INTERFERENCE CANCELATION FOR LTE (71) Applicant: Broadcom Corporation, Irvine, CA (US)

(72) Inventor: C. Ashok Kumar Reddy, Bangalore (IN)

(73) Assignee: Broadcom Corporation, Irvine, CA (US)

( * ) Notice: Subject to any disclaimer, the term of this patent is extended or adjusted under 35 U.S.C. 154(b) by 827 days.

(21) Appl. No.: 13/658,189

(22) Filed: Oct. 23, 2012

(65) Prior Publication Data
US 2013/0128877 A1    May 23, 2013

Related U.S. Application Data (60) Provisional application No. 61/562,196, filed on Nov. 21, 2011, provisional application No. 61/674,567, filed on Jul. 23, 2012.

(51) Int. Cl.
H04W 56/00    (2009.01)
H04J 11/00    (2006.01)
H04L 25/02    (2006.01)

(52) U.S. Cl.
CPC .......... H04J 11/004 (2013.01); H04J 11/0076 (2013.01); H04L 25/022 (2013.01); H04L 25/0204 (2013.01)

(58) Field of Classification Search
CPC .................................................. H04J 11/004
(Continued)

(56) References Cited

U.S. PATENT DOCUMENTS

2002/0097782 A1* 7/2002 Pajukoski .............. H04B 1/707
                                                       375/147
2006/0109780 A1* 5/2006 Fechtel .................... H04L 5/06
                                                       370/203
(Continued)

FOREIGN PATENT DOCUMENTS

CN    102469475 A    5/2012
CN    102572970 A    7/2012
EP    0 776 105 A1   5/1997

OTHER PUBLICATIONS

European Search Report for EP Patent Application No. EP13003472.1, European Patent Office, Munich, Germany, mailed on Nov. 22, 2013.

(Continued)

Primary Examiner — Parth Patel
(74) Attorney, Agent, or Firm — Sterne, Kessler, Goldstein & Fox P.L.L.C.

(57) ABSTRACT

Methods and systems for removing interference from strongly powered SSS sequences in a received signal so that comparatively weakly powered SSS sequences in the received signal can be detected are disclosed. The methods and systems can perform a first cell search using the received signal to detect a strongly powered SSS sequence. Using a known SSS sequence corresponding to the strongly powered SSS sequence, the channel over which the strongly powered SSS sequence is received can be estimated. The estimated channel can then be used to determine the contribution of the strongly powered SSS and PSS sequence to the received signal so that it can be canceled. With the contribution of the strongly powered SSS and PSS sequence canceled from the received signal, a second cell search can be performed using the received signal to detect a weakly powered SSS sequence.

20 Claims, 4 Drawing Sheets (58) Field of Classification Search
USPC .............. 370/350, 329, 336, 201, 280, 312
See application file for complete search history.

(56) References Cited

U.S. PATENT DOCUMENTS

| | | | | |
|---|---|---|---|---|
| 2006/0274820 A1* | 12/2006 | Walton | ................. | H04B 1/7073 375/148 |
| 2007/0066273 A1* | 3/2007 | Laroia | ............... | H04W 52/0235 455/343.2 |
| 2009/0202016 A1* | 8/2009 | Seong | ................. | H04B 7/0426 375/267 |
| 2010/0008282 A1* | 1/2010 | Bhattad | ................ | H04J 11/0069 370/312 |
| 2010/0008317 A1* | 1/2010 | Bhattad | ................ | H04L 1/0003 370/329 |
| 2010/0029213 A1 | 2/2010 | Wang | | |
| 2010/0080114 A1* | 4/2010 | Ratnam | ................ | H04L 5/0007 370/210 |
| 2010/0195774 A1* | 8/2010 | Lopez de Victoria | ............... | H04B 7/0848 375/343 |
| 2010/0272032 A1* | 10/2010 | Sayana | ................. | H04B 7/024 370/329 |
| 2010/0278132 A1* | 11/2010 | Palanki | ................ | H04B 1/7107 370/329 |
| 2011/0002403 A1* | 1/2011 | Wilhelmsson | ........ | H04L 5/0007 375/260 |
| 2011/0007694 A1* | 1/2011 | Kim | .................... | H04L 27/2657 370/329 |
| 2011/0026616 A1* | 2/2011 | Sestok | ................ | H04L 25/0204 375/260 |
| 2011/0085460 A1* | 4/2011 | Zhang | ................. | H04W 56/005 370/252 |
| 2011/0116561 A1* | 5/2011 | Yoo | .................... | H04L 27/2665 375/260 |
| 2011/0188447 A1* | 8/2011 | Wang | .................. | H04L 5/0053 370/328 |
| 2011/0188563 A1 | 8/2011 | Lopez et al. | | |
| 2011/0195684 A1* | 8/2011 | Zhang | ................. | H04B 1/7107 455/226.1 |
| 2011/0237214 A1* | 9/2011 | Swarts | ................. | H04W 56/00 455/226.1 |
| 2011/0268101 A1* | 11/2011 | Wang | .................. | H04L 5/0053 370/344 |
| 2011/0280200 A1* | 11/2011 | Fuchs | ................. | H04L 25/0204 370/329 |
| 2012/0044928 A1* | 2/2012 | Bhattad | ................ | H04J 11/0083 370/350 |
| 2012/0046056 A1* | 2/2012 | Luo | ......................... | H04J 11/005 455/502 |
| 2012/0069834 A1* | 3/2012 | Ancora | ............... | H04L 27/2647 370/343 |
| 2012/0082022 A1* | 4/2012 | Damnjanovic | ........ | H04J 11/005 370/201 |
| 2012/0087261 A1* | 4/2012 | Yoo | ......................... | H04L 25/03 370/252 |
| 2012/0163503 A1* | 6/2012 | Ancora | ................ | H04L 5/0048 375/316 |
| 2012/0195285 A1* | 8/2012 | Ko | ......................... | H04L 5/0048 370/330 |
| 2012/0231790 A1* | 9/2012 | Lindoff | ................ | H04W 48/16 455/434 |
| 2012/0269125 A1* | 10/2012 | Porat | ................. | H04W 72/1231 370/328 |
| 2013/0070869 A1* | 3/2013 | Motamed | .............. | H04L 5/0051 375/295 |
| 2013/0107785 A1* | 5/2013 | Bhattad | ................. | H04J 11/005 370/312 |
| 2013/0137427 A1* | 5/2013 | Krishnan | ............ | H04W 56/001 455/434 |
| 2014/0348040 A1* | 11/2014 | Hong | ................... | H04L 5/0007 370/280 |

OTHER PUBLICATIONS

Office Action directed to related Korean Patent Application No. 10-2013-0082032, mailed Jul. 22, 2014; 4 pages.

Office Action directed to related Taiwanese Patent Application No. 102125911, mailed Mar. 12, 2015; 5 pages.

European Office Action directed toward related EP Application No. 13003472.1, dated Jun. 5, 2015 from the European Patent Office; 5 pages.

Office Action directed to related Chinese Patent Application No. CN 201310311986.X, mailed Feb. 2, 2016; 11 pages.

English-language abstract of App. No. CN 102469475 A, published published May 23, 2012; 1 page.

English-language abstract of App. No. CN 102572970 A, published Jul. 11, 2012; 1 page.

* cited by examiner

SECONDARY SYNCHRONIZATION SIGNAL DETECTION WITH INTERFERENCE CANCELATION FOR LTE

CROSS REFERENCE TO RELATED APPLICATIONS

This application claims the benefit of U.S. Provisional Patent Application No. 61/562,196, filed Nov. 21, 2011, and of U.S. Provisional Patent Application No. 61/674,567, filed Jul. 23, 2012, all of which are incorporated by reference herein.

FIELD OF THE INVENTION

This application relates generally to cellular networks and, more specifically, to synchronization signal detection in cellular networks.

BACKGROUND

Figure 1:
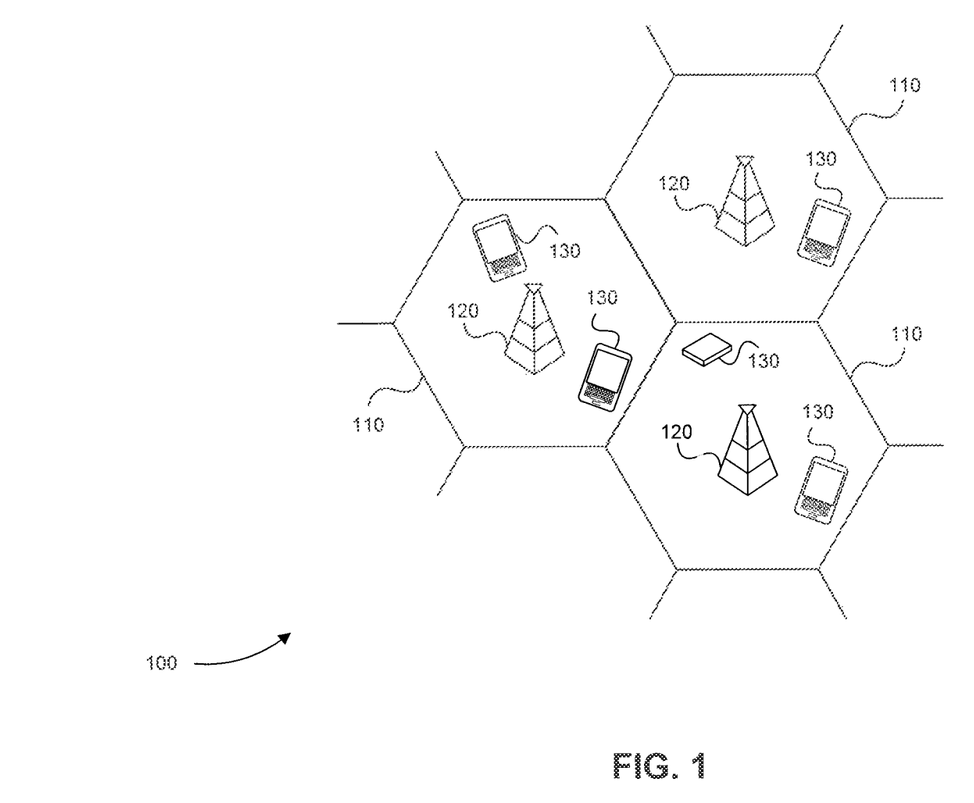
FIG. 1 illustrates an LTE cellular network in accordance with embodiments of the present disclosure.

FIG. 1 illustrates a Long-Term Evolution (LTE) cellular network 100 distributed over land areas 110 referred to as cells, each of which is served by a base station 120. The cells 110 are geographically joined together to enable LTE terminals 130 (e.g., mobile phones, laptops, tablets, etc) to wirelessly communicate over a wide area with a core network (not shown) via the base stations 120.

Before an LTE terminal can communicate over an LTE cellular network, such as the LTE cellular network 100 in FIG. 1, an LTE terminal typically needs to perform a cell search to acquire frequency and symbol synchronization to a cell and detect the physical-layer identity of the cell. For example, the LTE terminal can perform a cell search to acquire synchronization to the cell and detect the physical-layer identity of the cell in which it is located or some other cell. In addition, the LTE terminal can continuously perform the cell search to acquire synchronization to other nearby cells and detect the physical-layer identity of the other nearby cells. This allows the LTE terminal to move from one cell to another while maintaining substantial connectivity to the LTE cellular network. For example, if the signal quality supported by a current cell becomes less than the signal quality supported by one of the other nearby cells due to the movement of the LTE terminal, communications with the current cell can be handed off to the nearby cell supporting the higher signal quality.

Figure 2:
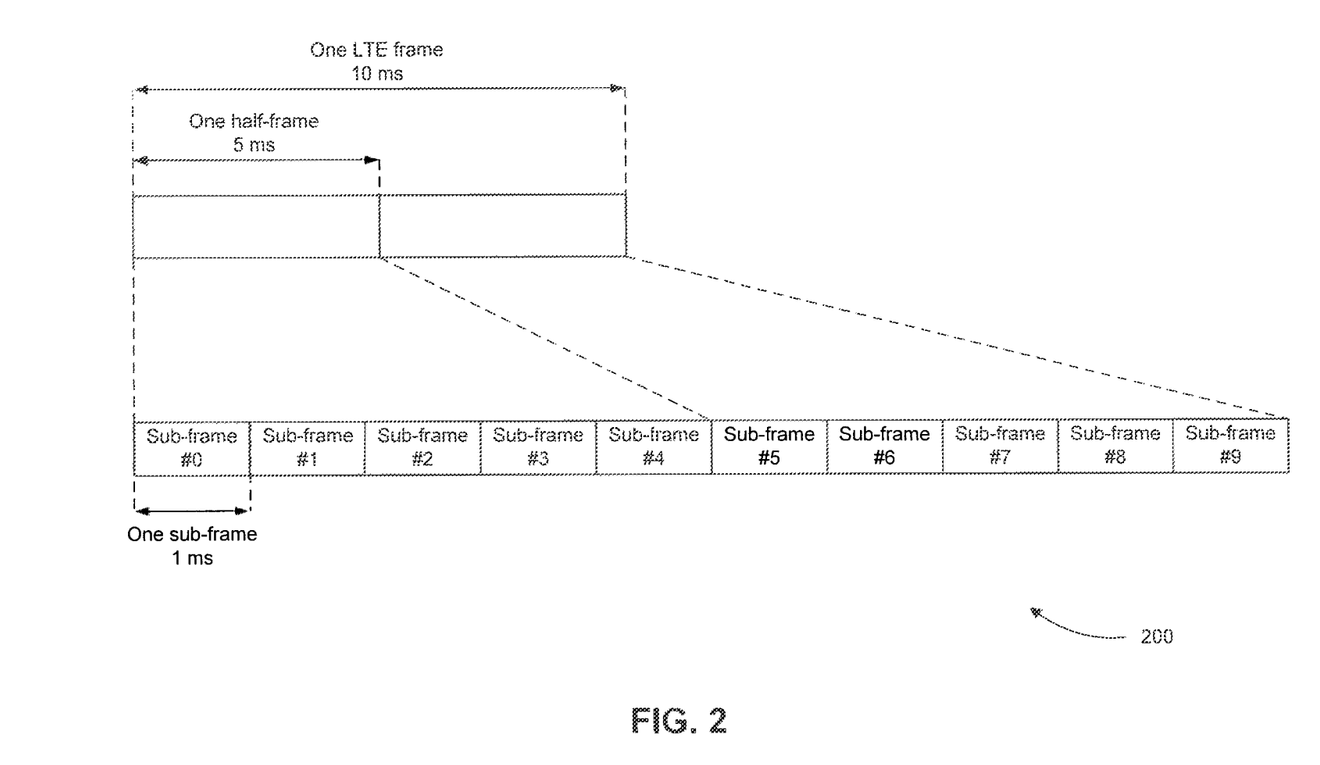
FIG. 2 illustrates a general LTE frame configuration in accordance with embodiments of the present disclosure.

Two synchronization signals—the Primary Synchronization Signal (PSS) and the Secondary Synchronization Signal (SSS)—are broadcast from base stations in the LTE cellular network to assist in the cell search. The time-domain position of these two signals within an LTE frame is generally constant from frame-to-frame to support synchronization and depends on whether the LTE cellular network is operating in a frequency-division duplexing mode (FDD) or a time-division duplexing mode (TDD). As shown in FIG. 2, the general LTE frame configuration 200 is ten milliseconds in duration and includes two, five millisecond half-frames. Each half-frame is further divided into five sub-frames (0-4 and 5-9) that are each one millisecond in duration. The sub-frames typically carry 14 orthogonal frequency division multiplexing (OFDM) symbols. In an LTE cellular network operating in the FDD mode, the PSS is typically transmitted in the last OFDM symbol of sub-frames 0 and 5, and the SSS is typically transmitted in the second to last OFDM symbol right before the PSS in the same sub-frames. In an LTE cellular network operating in the TDD mode, the PSS is typically transmitted in the third OFDM symbol of sub-frames 1 and 6, and the SSS is typically transmitted in the last OFDM symbol of sub-frames 0 and 5.

During the cell search, the LTE terminal uses the PSS and SSS to acquire frequency and symbol synchronization to a cell and detect a physical-layer cell identity of the cell. Detecting the physical-layer cell identity involves obtaining an identity $NID1=(0, \ldots, 167)$ of a group from the SSS sequence broadcast from a base station, and obtaining an identity $NID2=(0, 1, 2)$ within the group identified by NID1 from the PSS sequence broadcast by the base station. The group identity NID1 is detected from the SSS sequence after the identity NID2 within the group is detected from the PSS sequence. After detecting NID1 and NID2, the physical-layer cell identity can be determined using the relationship $NID=(3*NID1)+NID2$, where NID is the physical-layer cell identity. Because there are 168 unique group identities NID1 and three unique identities NID2 within each group, there are a total of 504 unique physical-layer identities in an LTE cellular network.

Typically, the LTE terminal receives strongly powered synchronization signals (i.e., PSS and SSS) from some base stations and comparatively weakly powered synchronization signals from other base stations. The strongly powered synchronization signals can overwhelm the weakly powered ones at the LTE terminal, preventing the LTE terminal from acquiring synchronization to and detecting the physical-layer identity of the cells from which the weakly powered synchronization signals originate. Acquiring synchronization to and detecting the physical-layer identity of these cells can be beneficial for several reasons, including for handing off communications from one cell to another due to, for example, movement of the LTE terminal.

BRIEF DESCRIPTION OF THE DRAWINGS/FIGURES

The accompanying drawings, which are incorporated herein and form a part of the specification, illustrate the embodiments of the present disclosure and, together with the description, further serve to explain the principles of the embodiments and to enable a person skilled in the pertinent art to make and use the embodiments.

The embodiments of the present disclosure will be described with reference to the accompanying drawings. The drawing in which an element first appears is typically indicated by the leftmost digit(s) in the corresponding reference number.

DETAILED DESCRIPTION

In the following description, numerous specific details are set forth in order to provide a thorough understanding of the embodiments of the present disclosure. However, it will be apparent to those skilled in the art that the embodiments, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the invention.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

1. Overview

Described below are methods and systems for removing interference from one or more strongly powered SSS sequences in a received signal so that one or more weakly powered SSS sequences in the received signal can be detected. The methods and systems can perform a first cell search using the received signal to detect a strongly powered SSS sequence. Using a known SSS sequence that corresponds to this strongly powered SSS sequence, the channel over which the strongly powered SSS sequence is received can be estimated. The estimated channel can then be used to determine an estimate of the contribution of the strongly powered SSS sequence to the received signal so that it can be canceled. The estimated channel can be further used to determine an estimate of the contribution of the PSS sequence of the cell from which the strongly powered SSS sequence was sent so that the contribution of this PSS sequence can also be canceled from the received signal. With the estimated contribution of the strongly powered SSS sequence and PSS sequence canceled from the received signal, a second cell search can be performed using the received signal to detect a weakly powered SSS sequence.

Once detected, the weakly powered SSS sequence can be used to acquire synchronization to and detect the physical-layer identity of the cell from which the weakly powered SSS sequence originated. Acquiring synchronization to and detecting the physical-layer identity of this cell can be beneficial for several reasons, including for handing off communications from a current cell to the cell corresponding to the weakly powered SSS sequence due to, for example, movement of an LTE terminal.

It should be noted that the description of an SSS/PSS sequence as being "strongly powered" refers to those SSS/PSS sequences that can be detected from a received signal during a cell search without canceling an estimated contribution to the received signal from one or more other SSS sequences, whereas the description of an SSS sequence as being "weakly powered" refers to those SSS sequences that cannot be detected from a received signal during a cell search without canceling an estimated contribution to the received signal from one or more other SSS sequences.

It should be further noted that, although the methods and systems of the present disclosure are described below in the context of an LTE cellular network, the methods and systems of the present disclosure are not so limited. One of ordinary skill in the art will recognize that the methods and systems of the present disclosure can be used in other cellular networks during cell searching operations.

2. SSS Sequence Detection Using Interference Cancelation

Figure 3:
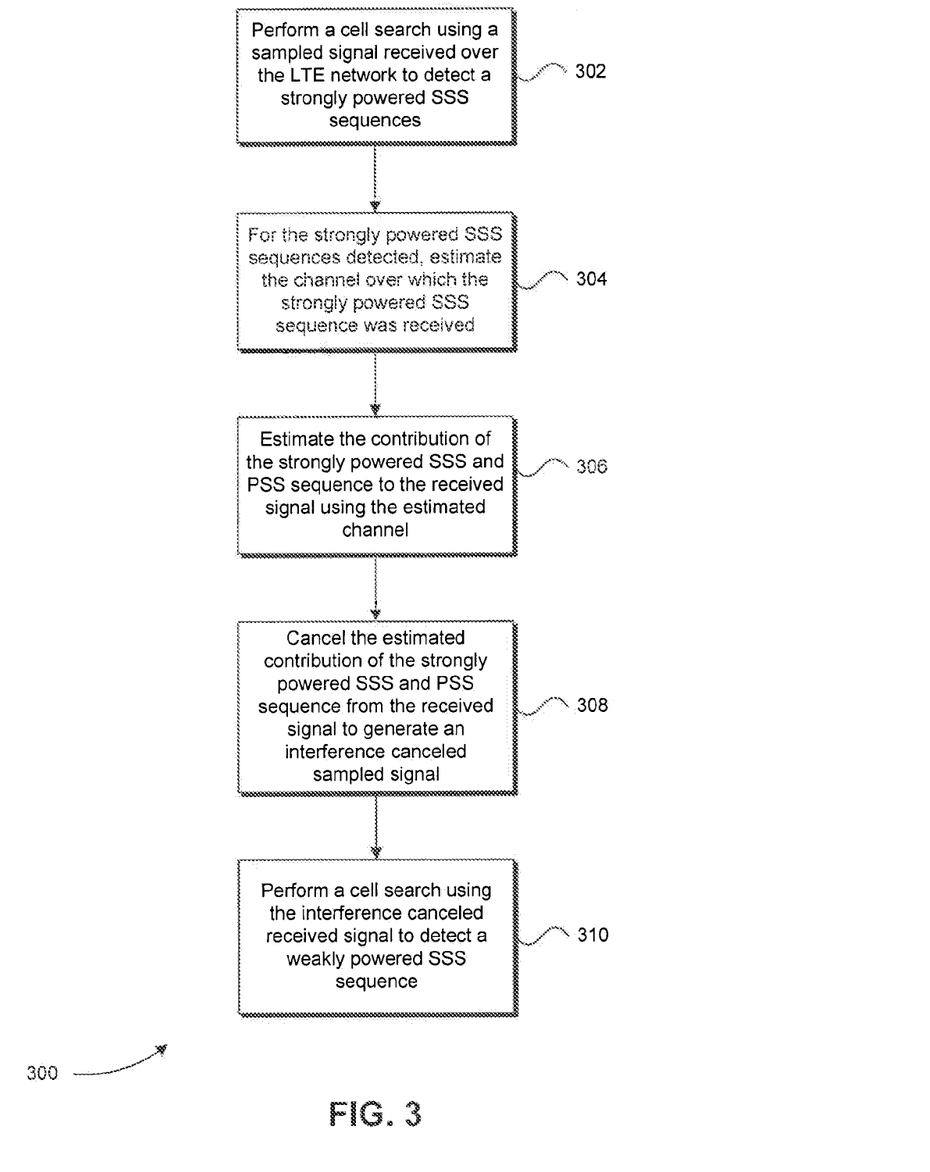
FIG. 3 illustrates a flowchart of a method for detecting weakly powered SSS sequences in an LTE cellular network using interference cancelation in accordance with embodiments of the present disclosure.

Referring now to FIG. 3, a flowchart 300 of a method for detecting a weakly powered SSS sequence (e.g., an NID1 value) in an LTE cellular network using interference cancelation is depicted in accordance with embodiments of the present disclosure. The method of flowchart 300 can be implemented by a processor, such as a digital signal processor, in an LTE terminal (e.g., a mobile phone, a laptop, a pager, a personal digital assistant, a tablet computer, an e-reader, etc.). However, it should be noted that the method can be implemented by other components and devices as well.

The method of flowchart 300 begins at step 302, where an initial cell search is performed by an LTE terminal to detect a strongly powered SSS sequence in a sampled signal x(k) received over an LTE network. The received signal x(k) corresponds to a "composite" OFDM symbol made up of overlapping OFDM symbols broadcast from base stations in the LTE cellular network, and k represents a sampling instance. The strongly powered SSS sequence detected in the received signal x(k) corresponds to one of the overlapping OFDM symbols. Methods for detecting the strongly powered SSS sequence in the received signal x(k) are well known and are not detailed herein.

At step 304, a channel is estimated over which the strongly powered SSS sequence detected at step 302 is received by the LTE terminal. In one embodiment, the channel is estimated by taking the fast Fourier transform (FFT) of the received signal x(k) to transform the received signal x(k) into the frequency domain. Assuming that OFDM symbols used in the LTE network have, for example, 128 associated time-domain samples, and the received signal x(k) is sampled at a proper rate such that it includes 128 time-domain samples that correspond to the time domain samples of the "composite" OFDM symbol mentioned above, a 128-point FFT of the received signal x(k) can be performed to recover the data carried by 64 orthogonal tones of the "composite" OFDM symbol. Let the FFT of the received signal x(k) be represented by:

$$X = \text{FFT}_{N_{fft}}(x) \qquad (1)$$

where $N_{fft}=128$ in equation (1).

After the FFT is performed, tones of interest in the frequency domain representation of the received signal X can be extracted. Let the extracted tones of interest be represented by:

$$\hat{X} = [X(\text{StartTone}), \ldots, X(\text{EndTone})] \qquad (2)$$

where StartTone and EndTone are variables. In one embodiment the variables StartTone and EndTone are determined such that the tones of interest include 63 in total: the 31 closest tones on both sides of the DC tone and the DC tone itself. In other embodiments, more or less tones can be extracted from the frequency domain representation of the received signal X, including all tones.

Next, the extracted tones of interest on SSS, represented by $\hat{X}_{SSS}$, can be element wise multiplied by a known SSS sequence C corresponding to the strongly powered SSS sequence for which the channel is being estimated. Let the element wise product of these two values be represented by:

$$Y = \hat{X}_{SSS} * C \qquad (3)$$

where * represents the operator for element wise multiplication.

After obtaining the vector Y, the value of vector Y at its DC tone index can be replaced with the value of one of the two tones adjacent to the DC tone in the vector Y, the average value of the two tones adjacent to the DC tone in the vector Y, or some other value. The vector Y can be extended to length 64 by, for example appending the value of the tone at index 63 to the end of the vector Y or by pre-appending the value of the tone at index 1 to the beginning of the vector Y. This vector can be transformed by determining a 64-point or 128-point inverse fast Fourier transform (IFFT). For performing 128 point IFFT, the vector Y can be appended with equal number of zeros at the start and end of the vector to make it a 128 length vector from a 64 length vector. Let the IFFT of this vector be represented by:

$$y = \text{IFFT}_{N_{ifft}}(Y) \tag{4}$$

where $N_{ifft}$=64 or 128 in equation (4).

Next, noise values in the vector y can be zeroed out by using an estimate of the index $Loc_{Max}$ in vector y associated with the value in vector y having the highest energy and by using an estimate of the delay spread ChanSpread of the channel being estimated. The vector y can specifically be zeroed as follows:

$$y(1:Loc_{Max}-2)=0; \text{ and} \tag{5}$$

$$y((Loc_{Max}+\text{ChanSpread}+1):N_{ifft})=0 \tag{6}$$

where $N_{ifft}$ is the value used in equation (4). The index $Loc_{Max}$ can be estimated, for example, by squaring each element in the vector y of equation (4) and identifying the index for the squared element having the largest value. Alternatively, the index $Loc_{Max}$ can be estimated, for example, after calculating multiple vectors in a similar manner as vector y based on earlier or later signals received over the LTE cellular network and/or based on the same signal x(k) received by other antennas, squaring each element of these calculated vectors and adding or averaging the corresponding squared elements of each calculated vector, and finally using the added or averaged squared elements to identify the index for the added or averaged squared element having the largest value. It should be further noted that the value 2 used in equation (5) above can be made configurable and can be set to any suitable value. The method of choosing the noise value locations to be zeroed can be done in other alternative ways, for example choosing all the values that are lesser than a threshold that is obtained as a scaled version of noise power estimated on y.

After the noise values in vector y have been zeroed out, a 64-point or 128-point (as chosen in equation (4)) FFT of the vector y can be determined to estimate the channel over which the strongly powered SSS sequence was received by the LTE terminal. Let the FFT of the vector y after its noise values have been zeroed out be represented by:

$$H = \text{FFT}_{N_{fft}}(y) \tag{7}$$

where $N_{fft}$=64 or 128 in equation (7), which depends on the $N_{ifft}$ chosen in equation (4).

At step 306, an estimate of the contribution of the strongly powered SSS and PSS sequence to the received signal x(k) is determined using the estimated channel H obtained in equation (7). Choose from the channel estimate H in equation (7), the channel estimate required on the tone locations where the synchronization signal is transmitted and call it $H_{SSS}$. The estimate of the contribution of the strongly powered SSS and PSS sequence to the received signal x(k) can specifically be determined by element wise multiplying the estimated channel $H_{SSS}$ by the known SSS sequence $C_{SSS}$ corresponding to the strongly powered SSS sequence and $C_{PSS}$ corresponding to strongly powered PSS sequence respectively. Let the element wise product of these two values be represented by:

$$R_{SSS} = H_{SSS} * C_{SSS} \tag{8}$$

$$R_{PSS} = H_{SSS} * C_{PSS} \tag{8a}$$

where * represents the operator for element wise multiplication.

At step 308, the estimated contribution $R_{SSS}$ of the strongly powered SSS sequence and $R_{PSS}$ of the strongly powered PSS can both be canceled from the tones of interest $\hat{X}_{SSS}$ and $\hat{X}_{PSS}$ (expressed in equation (2) above) respectively in the frequency domain representation of the received signal X as follows:

$$\tilde{X}_{SSS} = \hat{X}_{SSS} - R_{SSS} \tag{9}$$

$$\tilde{X}_{PSS} = \hat{X}_{PSS} - R_{PSS} \tag{9a}$$

Finally, at step 310 a cell search for a weakly powered SSS sequence is performed using the interference canceled received signal $\tilde{X}_{SSS}$ expressed in equation (9) above. The cell search for the weakly powered SSS sequence can be performed using a known technique, which may use PSS sequence with interference cancelled from the received signal as expressed in equation (9a) above.

Once detected, the weakly powered SSS sequence can be used to acquire synchronization to and detect the physical-layer identity of the cell from which the weakly powered SSS sequence originated. Acquiring synchronization to and detecting the physical-layer identity of this cell can be beneficial for several reasons, including for handing off communications from a current cell to the cell corresponding to the weakly powered SSS sequence due to, for example, movement of an LTE terminal.

It should be noted that, before performing step 310, steps 302-308 can be repeated again for other strongly powered SSS and PSS sequences detected in the received signal x(k). In addition, it should be also noted that steps 304-308 can be repeated again to remove a weakly powered SSS and PSS sequence detected in step 310, as opposed to a strongly powered SSS and PSS sequence detected in step 302.

Figure 4:
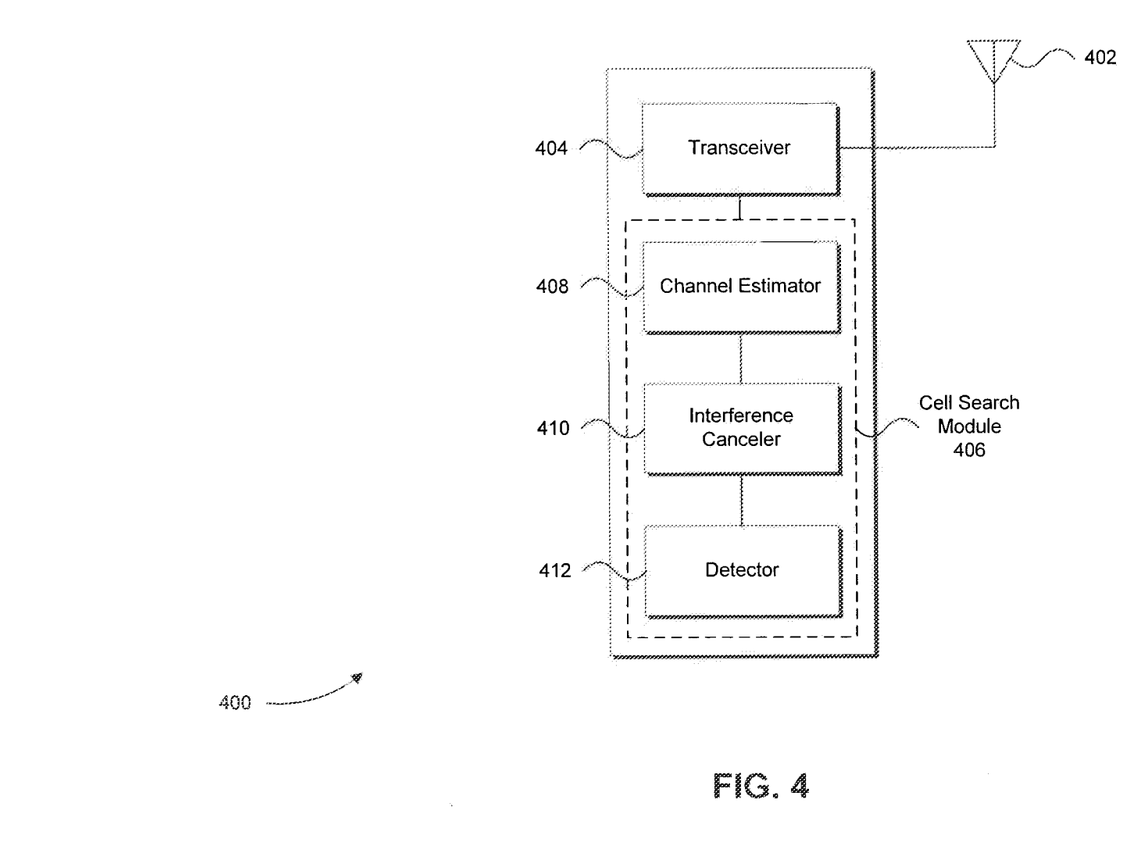
FIG. 4 illustrates an exemplary LTE terminal in accordance with embodiments of the present disclosure.

FIG. 4 illustrates a block diagram of an exemplary LTE terminal 400 according to embodiments of the present disclosure. The LTE terminal 400 can be, for example, a mobile phone, a laptop, a pager, a personal digital assistant, a tablet computer, an e-reader, etc., and can be used to implement the method for detecting a weakly powered SSS sequence (e.g., an NID1 value) in an LTE cellular network using interference cancelation as depicted in flowchart 300 of FIG. 3.

As shown in FIG. 4, the LTE terminal 400 includes an antenna 402, a transceiver 404, and a cell search module 406. The cell search module 406 specifically includes a channel estimator 408, an interference canceler 410, and a detector 412. These modules can be implemented in hardware, software, or any combination thereof. For example, one or more of these modules can be implemented by software stored in a computer readable medium and executed by a processor, such as a digital signal processor. In other examples, one or more of these modules can be implemented by a dedicated hardware block or special purpose processor specifically configured to implement the functionality of the one or more modules.

In operation of the LTE terminal 400, the antenna 402 is configured to receive signals transmitted over an LTE network by base stations located in various cells. The signals can be formatted according to the basic LTE frame configuration shown in FIG. 2 and include PSS and SSS sequences as noted above. The transceiver 404 is configured to down-convert and sample the signal received by the antenna 402. The down-converted and sampled portion of this signal corresponds to received signal x(k), mentioned above in FIG. 3, and can be provided by the transceiver 404 to the cell search module 406 to perform the method for detecting a weakly powered SSS sequence (e.g., an NID1 value) using interference cancelation as depicted in flowchart 300 of FIG. 3. In particular, the detector 412 can be configured to perform the steps 302 and 310 in flowchart 300, the channel estimator 408 can be configured to perform the step 304, and the interference canceler 410 can be configured to perform the steps 306 and 308. However, it should be noted that the channel estimator 408, the interference canceler 410, and the detector 412 can be configured to perform other functions.

3. Conclusion

The present disclosure has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

What is claimed is:

1. A method for detecting a first and second secondary synchronization signal (SSS) sequence in a received signal, the method comprising:
    detecting the first SSS sequence in the received signal;
    estimating a channel over which the first SSS sequence is received as an element wise product of a frequency domain representation of samples of the received signal and a known SSS sequence corresponding to the first SSS sequence, wherein a value of the element wise product at a DC tone index is determined based on a value of the element wise product at a different tone index than the DC tone index;
    estimating a contribution of the first SSS sequence to the received signal using the channel estimate;
    canceling the contribution estimate of the first SSS sequence from the received signal to generate an interference canceled received signal; and
    detecting the second SSS sequence using the interference canceled received signal.

2. The method of claim 1, further comprising:
    canceling a contribution estimate of the second SSS sequence from the received signal to detect a third SSS sequence.

3. The method of claim 1, wherein the different tone index than the DC tone index is one of the two tone indices adjacent to the DC tone index, wherein estimating the channel further comprises:
    using the received signal and a known SSS sequence corresponding to the first SSS sequence.

4. The method of claim 1, wherein the different tone index than the DC tone index is one of the two tone indices adjacent to the DC tone index.

5. The method of claim 1, further comprising:
    obtaining the samples of the received signal based on a location of the first SSS sequence in the received signal.

6. The method of claim 1, further comprising:
    removing noise in a time domain representation of the element wise product based on estimated energies of elements in the time domain representation and an estimated delay spread of the channel.

7. The method of claim 1, further comprising:
    acquiring synchronization to a cell using the second SSS sequence.

8. The method of claim 1, further comprising:
    determining a physical-layer cell identity of a cell using the second SSS sequence.

9. A terminal for detecting a first and second secondary synchronization signal (SSS) sequence in a received signal, the terminal comprising:
    a channel estimator configured to estimate a channel over which the first SSS sequence is received as an element wise product of a frequency domain representation of samples of the received signal and a known SSS sequence corresponding to the first SSS sequence, wherein a value of the element wise product at a DC tone index is determined based on a value of the element wise product at a different tone index than the DC tone index;
    an interference canceler configured to generate an interference canceled received signal by:
        estimating a contribution of the first SSS sequence to the received signal using the channel estimate and canceling the contribution estimate of the first SSS sequence from the received signal, and
        estimating a contribution of a first primary synchronization signal (PSS) sequence to the received signal using the channel estimate and canceling the contribution estimate of the first PSS sequence from the received signal; and
    a detector configured to detect the second SSS sequence using the interference canceled received signal.

10. The terminal of claim 9, wherein the sequence detector is further configured to detect the first SSS sequence in the received signal.

11. The terminal of claim 10, wherein the different tone index than the DC tone index is one of the two tone indices adjacent to the DC tone index.

12. The terminal of claim 10, wherein the channel estimator is further configured to extend a length of the element wise product by appending a value to an end of the element wise product.

13. The terminal of claim 10, wherein the samples of the received signal are obtained based on a location of the first SSS sequence in the received signal.

14. The terminal of claim 10, wherein the channel estimator is further configured to remove noise in a time domain representation of the element wise product based on estimated energies of elements in the time domain representation and an estimated delay spread of the channel.

15. The terminal of claim 9, wherein the detector is further configured to use the second SSS sequence to acquire synchronization to a cell.

16. The terminal of claim 9, wherein the detector is further configured to use the second SSS sequence to determine a physical-layer cell identity of a cell.

17. A terminal for detecting a first and second sequence in a received signal, the terminal comprising:
    a channel estimator configured to estimate a channel over which the first sequence is received as an element wise product of a frequency domain representation of samples of the received signal and a known sequence corresponding to the first sequence, wherein a value of the element wise product at a DC tone index is determined based on a value of the element wise product at a different tone index than the DC tone index;

an interference canceler configured to estimate a contribution of the first sequence to the received signal using the channel estimate and to cancel the contribution estimate from the received signal to generate an interference canceled received signal; and a detector configured to detect the second sequence using the interference canceled received signal.

18. The terminal of claim 17, wherein the different tone index than the DC tone index is one of the two tone indices adjacent to the DC tone index.

19. The terminal of claim 17, wherein the channel estimator is further configured to extend a length of the element wise product by appending a value to an end of the element wise product.

20. The terminal of claim 17, wherein the channel estimator is further configured to remove noise in a time domain representation of the element wise product based on estimated energies of elements in the time domain representation and an estimated delay spread of the channel.

\* \* \* \* \*